Patented Aug. 28, 1945

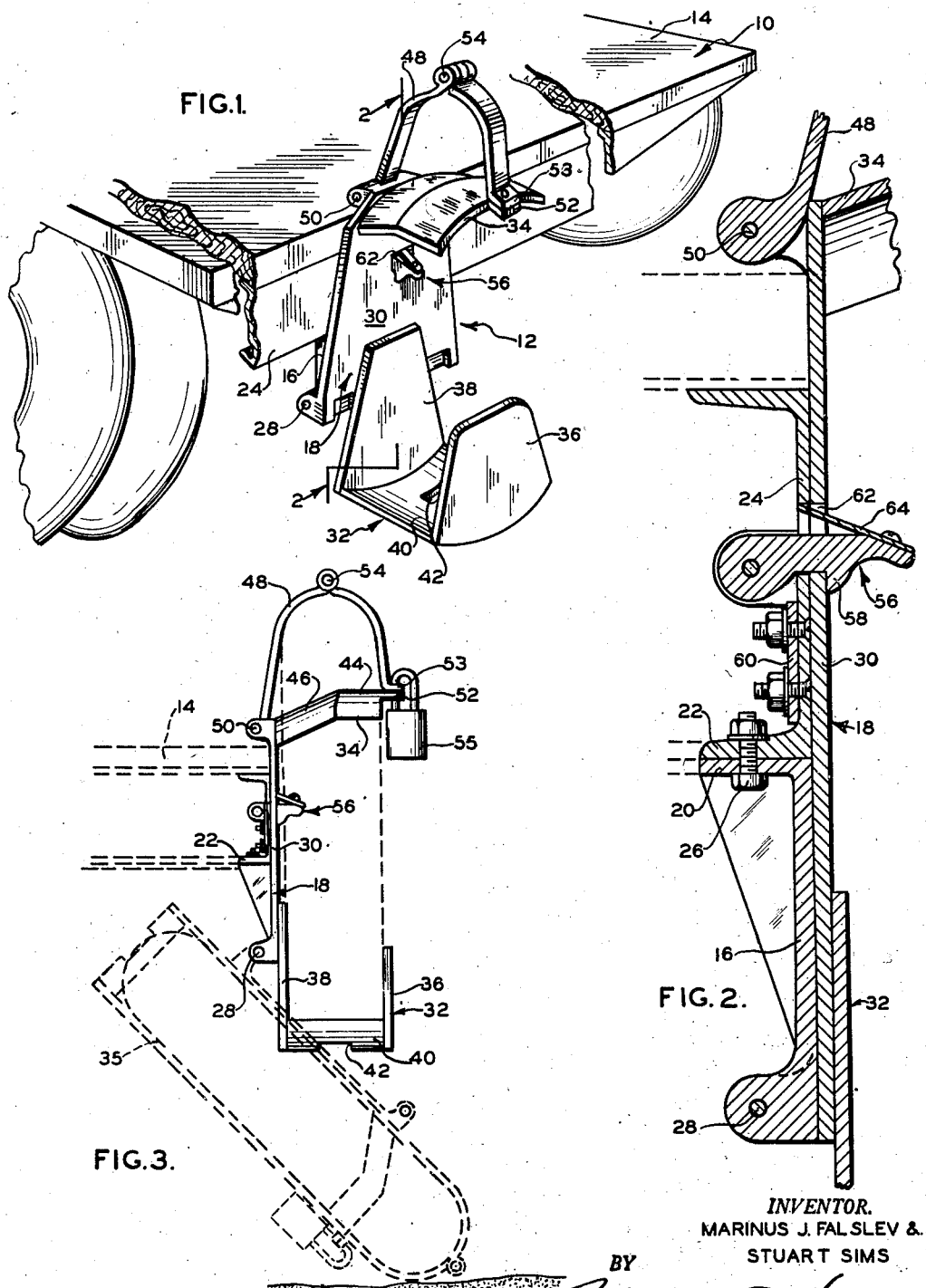

2,383,476

UNITED STATES PATENT OFFICE 2,383,476

TIRE CARRIER

Marinus J. Falslev, Avon-by-the-Sea, and Stuart Sims, Red Bank, N. J.

Application September 13, 1943, Serial No. 502,186

2 Claims. (Cl. 224—29)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to tire carriers and more particularly to tire and rim carriers adapted to be mounted on automobile trucks and trailers for the purpose of providing storage for a spare tire and rim.

A common type of spare tire carrier is permanently mounted in a vertical position on the rear portion of automobile trucks and trailers, and, ordinarily, in a position relatively high above the ground in order to avoid striking same when the vehicle is driven over irregular, sandy or muddy terrain. This is especially true in the case of motor vehicles used to transport war machines in combat areas.

The conventional tire carrier mounted in this way suffers a serious disadvantage in that when carried high on the rear portion of a truck or trailer, the carrier is so positioned that it effectively interferes with the performance of the normal loading, unloading or other necessary operations. For example, when loading or unloading, it is often necessary either to remove the carrier and its contents from its support, or to lift the cargo over the vertically extending tire carrier. The latter alternative is usually the preferred one inasmuch as the task of removing the bolts employed for securing the carrier, and demounting it with its spare tire and rim, is generally regarded as more difficult and time consuming, and, at the same time, involves the danger of driving off and leaving the demounted carrier.

An object, therefore, of our invention is to generally improve the art of tire and rim carriers.

Another object of this invention is to provide a spare tire and rim carrier which is permanently attached to a vehicle in a manner such that its separation therefrom is not readily affected.

Still another object of our invention is the provision of a tire and rim carrier adapted to be pivotally mounted on the rear portion of an automobile truck or trailer in a manner such that it may easily be swung out of position during loading, unloading or other necessary operations.

A further object of this invention is to provide a tire and rim carrier in which the mounting and demounting of a tire and rim are relatively simple operations.

In accordance with the present invention, we contemplate a spare tire and rim carrier for a motor truck or trailer having a frame or a chassis, said carrier comprising a carrier member pivotally connected to said frame or chassis for swinging movement from a sustained vertical position to a dropped inclined position relative to the frame and vice versa, said member being adapted to removably mount a spare tire and rim, and means on the frame cooperating with said carrier member for releasably retaining said member in said sustained position.

To the accomplishment of the foregoing general objects and such other more specific objects as hereinafter appear, our invention consists in the apparatus elements and their relation to one another as are hereinafter described and claimed in the following specification.

The specification is accompanied by a drawing in which

Fig. 1 is a perspective view of the rear portion of an automobile truck or trailer on which a tire carrier according to our invention is mounted;

Fig. 2 is a sectional view taken in the plane of the line 2—2 of Fig. 1, drawn to an enlarged scale, and;

Fig. 3 is a side elevational view of the carrier wherein the latter is shown in dropped position by means of dotted lines.

Referring to the drawing and more particularly to Fig. 1 thereof, the rear portion of an automobile truck or trailer is generally designated by the numeral 10 and is shown carrying a spare tire and rim carrier 12 symmetrically disposed intermediate the sides of a flat top load carrying platform 14.

While we have here illustrated our invention as applied to an automobile truck or trailer having a flat, open, rear loading platform, it will be understood that our invention may equally well be applied to a truck or trailer having an enclosed body.

Viewed in its broader aspects, the carrier 12 is formed as a hinge having a plate member 16 rigidly attached to the rear portion 10 of the truck, and a tire-carrying member, generally indicated by 18, pivotally connected to said plate member 16.

As shown in more detail in Fig. 2, the plate member 16 is provided at its free end with a horizontally extending flange 20 which may be attached to an adjacent flange 22 of a rear bed plate channel member 24, in any suitable manner. In the illustrated embodiment, the adjacent flanges 20, 22 are provided with aligned openings through which bolt and nut fastening means 26 are passed.

The tire carrying member 18 is hingedly connected, as at 28, to said fixed plate member 16, and comprises a flat hinge plate 30, having a cradle 32 and a rim support 34 secured to the lower and upper edges, respectively, of said hinge plate 30. The cradle 32 and rim support 34 are preferably connected to the hinge plate 30 by welding, although any other means may be employed for the same purpose.

As will be clearly evident from Figs. 1 and 3, the cradle 32 is adapted to snugly receive the peripheral portion of a tire shown in phantom in Fig. 3 at 35 and comprises a pair of spaced front and rear walls 36, 38 supported in mutual parallel relation by a concavely shaped floor 40 which is provided at its center with an opening 42 in order to permit drainage of water which may accumulate therein.

The rim support 34 is arcuately shaped with a radius of curvature appreciably less than that of the floor 40 in order to receive the peripheral edge of a tire rim (not shown) on which the tire 35 is mounted.

In order to throw the weight of the tire and rim toward the hinge plate 30 and thus more nearly align the weight with the center of rotation 28, the rim support 34 is preferably formed with a horizontally disposed forward portion 44 and a downwardly sloping rear portion 46 (Fig. 3), which may be welded to said forward portion 44.

A curved locking strap 48 is pivotally connected at one end to the upper edge of the hinge plate 30 by means of pin 50 and extends transversely over the tire 35 (Fig. 3) to an apertured lug 52 projecting from the forward portion 44 of the rim support 34.

The free end of the strap 48 is provided with an apertured off-set portion 53 aligned with and adapted to cooperate with said apertured lug 52, to receive a padlock 55 or other suitable locking device in order to secure the off-set portion 53 of the strap 48 to said lug 52, thus keeping the tire secure in the tire carrier. In order to allow for the mounting and demounting of the tire, the strap 48 is split and provided with a hinge connection 54 so that the forward portion of the strap may be raised and lowered from closed to open position.

The tire carrier is retained in its normal vertical position adjacent the trailer platform by means of a spring-pressed latch generally designated by 56. The details of the latch, as shown in Fig. 2, include a toothed lever 58 pivotally mounted on a latch hinge plate 60 for movement in a vertical plane. The plate 60 is mounted and secured to the rear bed plate channel member 24 by suitable bolts and nuts. Said bed plate channel member 24 together with the hinge plate 30 are provided with aligned rectangular openings 62 through which the toothed lever 58 may extend.

The lever is normally pressed downwardly by a flat spring 64 permanently attached at one end to the free end of said lever 58, the other end thereof being frictionally positioned against the rear upper portion of said opening 62 in such a manner that the tooth of the lever 58 engages the outer face of the hinge plate 30, holding the latter and the carrier attached thereto in vertical position.

In operation, the lever is manually raised against the force of the spring, thereby releasing the hinge plate 30 and the attached carrier, thus permitting the carrier 12 to be swung to the ground about pivot 28, to assume the position indicated in dotted lines (see Fig. 3).

When in the dropped position, it is obvious that the loading, unloading or other necessary operations may be performed with substantially no interference from the carrier. It will also readily be seen that, when the padlock 55 is preliminarily opened and removed while the carrier is still in a vertical position, and the latch 56 is released allowing the carrier to be swung to dropped position, the complete removal of the tire from the carrier is made possible without the exertion of additional effort. When it is desired to mount the tire in the carrier, we have found that it is easier to do so with the carrier in said dropped position.

While there has been described what is at present considered the preferred embodiment of our invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A tire carrier for retaining a tire and rim in either normal or dropped positions, wherein, in normal position, a tire and tube may be substantially vertically disposed and, in dropped position, may be disposed at an angle of more than 90° and less than 180° from the normal position, comprising a substantially arcuate cradle, substantially U-shaped in cross-section, adapted to accommodate the outer surface of the bottom sector portion of a vertically disposed tire; a substantially arcuate rim support disposed above said cradle and adapted to accommodate the inner surface of the top sector portion of a vertically disposed rim; a member joining said cradle and rim support; a strap over said rim support adapted to retain a tire mounted upon a rim in position in said cradle and upon said rim support; said member, cradle, rim support and strap being pivotally mounted for rotation, as a unit, about a horizontal pivot axis; said pivot axis being disposed perpendicularly to a vertical plane through the axis of a tire mounted in said carrier and lower than such tire axis and higher than the lower peripheral edge of such a tire; latch means to releasably retain said unit against rotation from its normal position; said unit, upon release of the latch means, being rotatable about its pivot axis aforesaid, through an angle of more than 90° and less than 180°, to a dropped position, in which position the sector of a tire adjacent said rim support may rest upon the ground and the diametrically opposite sector of said tire may rest within, and be supported by, the U-shaped cradle aforesaid.

2. A tire carrier for a vehicle, which is adapted to normally sustain a tire and rim in a raised position so as not to interfere with operation of the vehicle but which may allow said tire and rim to be moved to a lowered position to allow free access to the body of the vehicle or to facilitate mounting or removal of a tire and rim, comprising a support, rigidly attached to said vehicle and extending downwardly therefrom; and a carrying member hingedly secured to the lower portion of said support; said carrying member including a hinge plate provided at its lower portion with a cradle and at its upper portion with a rim support; said cradle comprising spaced, substantially parallel, front and rear walls, joined by a concave floor and being adapted to receive a lower sector of a tire; said rim support comprising an arcuate flange extending outward from the hinge plate aforesaid and being adapted to receive a rim thereon; the hinge axis of the carrying member being located lower than the axis of, and higher than the lower peripheral edge of, a tire mounted upon the carrier member, when in its normal raised position; a locking strap pivotally attached to said carrying member and adapted to extend over a peripheral edge, adjacent said rim support, of a tire mounted on said carrying member to secure it in place thereon; a releasable latch adapted to retain said carrying member in its normal raised position; said carrying member, in its raised position, being adapted to sustain a tire and rim in a substantially vertical position well above the ground; said carrying member, upon release of the latch, being free to pivot, through an angle greater than 90° and smaller than 180°, about the hinge axis aforesaid, to its lowered position, in which position a tire, mounted upon said carrying member, may be disposed in an angulated position, one sector thereof resting upon the ground and the diametrically opposite sector being supported above the ground by the front wall of the cradle aforesaid.

MARINUS J. FALSLEV.
STUART SIMS.